United States Patent [19]

Shepley

[11] Patent Number: 5,174,691

[45] Date of Patent: Dec. 29, 1992

[54] HIGH FEED RATE DEEP PENETRATION DRILL

[75] Inventor: Barry E. Shepley, Windsor, Canada

[73] Assignee: Ford Motor Company, Dearborn, Mich.

[21] Appl. No.: 403,273

[22] Filed: Sep. 5, 1989

[51] Int. Cl.⁵ .................. B23B 35/00; B23B 51/02
[52] U.S. Cl. .................. 408/1 R; 408/59; 408/230
[58] Field of Search .......... 406/230, 59, 715, 705, 406/227-229, 210, 144, 704, 1 R; 76/108 T, 108.6

[56] References Cited

U.S. PATENT DOCUMENTS

| | | | |
|---|---|---|---|
| 1,069,930 | 8/1913 | Down | 408/230 X |
| 2,817,983 | 12/1957 | Mossberg | 408/144 X |
| 2,912,887 | 3/1958 | Andreasson. | |
| 3,040,605 | 6/1962 | Andreasson | 408/59 |
| 3,045,513 | 7/1962 | Andreasson | 408/59 |
| 3,085,453 | 4/1963 | Mossberg | 408/144 X |
| 3,359,837 | 1/1965 | Andreasson. | |

FOREIGN PATENT DOCUMENTS 1302191 9/1961 France ................. 408/59

Primary Examiner—Daniel W. Howell
Attorney, Agent, or Firm—Joseph W. Malleck; Roger L. May

[57] ABSTRACT

A drill construction to overcome the problem of high speed (>5000 rpm), high feed rate (>200 inches/minute) chip removal in deep hole drilling of nonferrous workpieces, comprising: (a) a shank for receiving rotary power, (b) an elongate bit extending from such shank coaxially aligned therewith and having a continuous single spiral land occupying one quadrant or less of said bit cross-section with a single spiral flute surrounding said land; (c) a cutting end portion extending integrally from said bit, said end portion having a conically-shaped end surface interrupted by diametrically opposed flutes, one of said flutes being a continuation of the bit flute thereby to define cutting edges, said edges further being defined by arcuate indentations resulting in a plurality of cusps to assist in breaking chips as they are formed; and (d) channels for conducting high pressure (>800 psi) fluid for cooling the bit, end portion, and chips during drilling and for hydrodynamically forcing the broken chips along said flutes, said high pressure fluid means extending centrally axially through said shank and end portion, terminating in exit openings in said end surface.

6 Claims, 1 Drawing Sheet

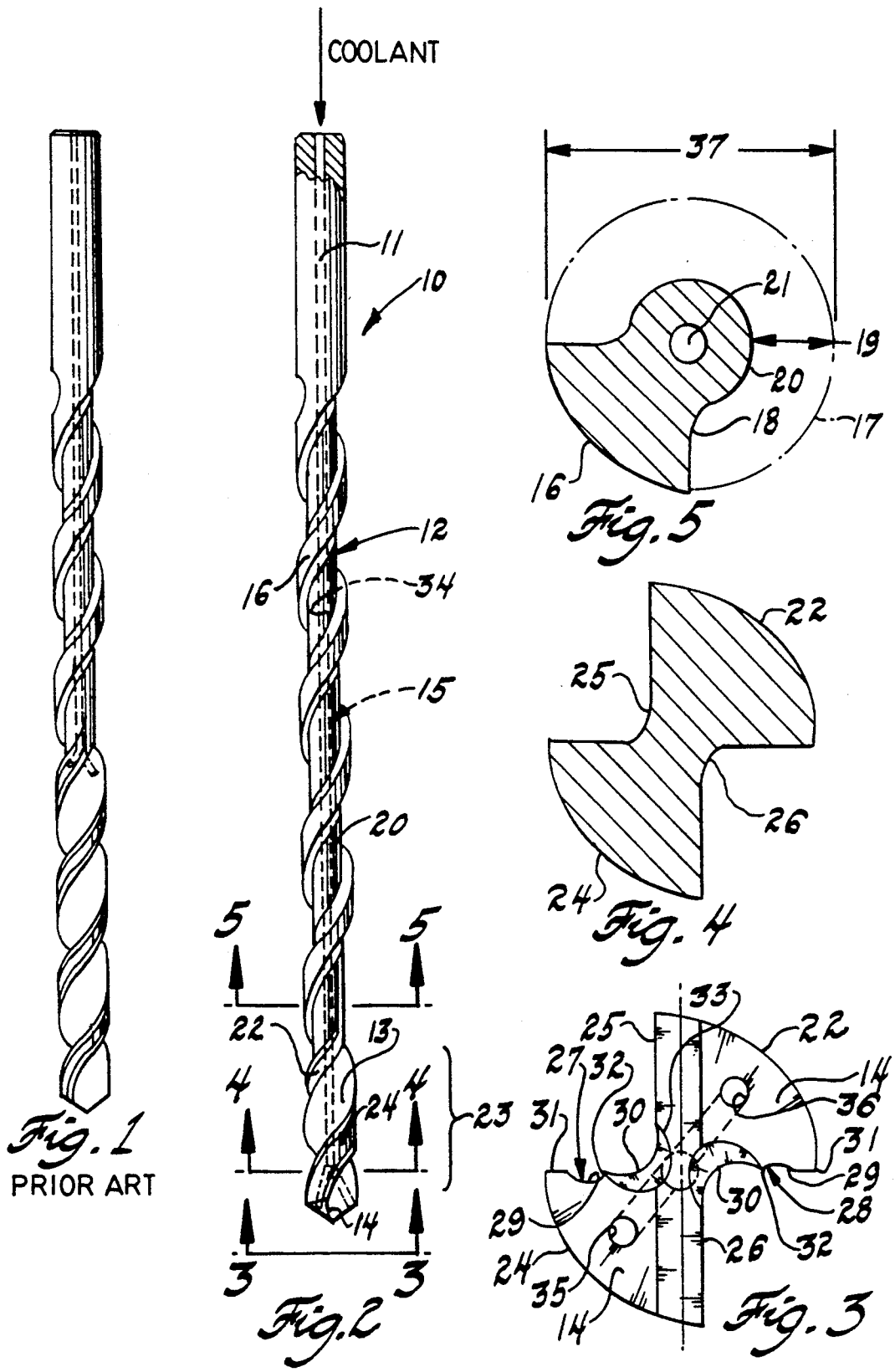

HIGH FEED RATE DEEP PENETRATION DRILL

BACKGROUND OF THE INVENTION

1. Field of the Invention

This invention relates to the art of making rotary drilling tools and more particularly to the art of drilling nonferrous metals at high feed rates, high speeds, and with deep penetration.

2. Discussion of the Prior Art

A significant problem inhibiting deep hole drilling of metals is the inability to remove chips and cutting debris fast enough so that the drill cutting edges are not clogged or jammed.

One of the earliest drill constructions used to achieve close tolerance holes in metals has been gun drills. Such drills essentially comprise a cylinder of metal having a diameter essentially the same size as the hole to be achieved, with a wide but axially extending and axially straight groove or flute along one side of the cylinder to define the cutting edges. The groove is intended to allow for metal chips to force their way out of the drilled opening therethrough by mechanical action of the generation of the chips themselves. Unfortunately, gun drills do not have good centering capability when high torque is applied; such unbalanced forces cause off-centering and cause bending which may result in scoring. Such gun drills cannot be used at high rotary speeds and are ineffective for accurate deep hole penetration.

Spiral fluted drills with multiple lands have been used to ensure greater hole centering accuracy (see U.S. Pat. No. 3,359,837). Unfortunately, spiral fluted drills rely on the mechanical nature of the chips to force their way out of the drill, up through the spiral flutes, which mechanical action cannot be carried out at high speed and high feed rates.

U.S. Pat. No. 2,912,887 discloses an improvement to gun drills and to the spiral fluted drills, which is particularly adapted for deep hole drilling. It uses double, diametrically opposed, spiral flutes for accurate deep hole drilling and uses a single spiral flute higher up the shank of the bit to facilitate the deployment of cutting fluid to assist in moving chips or cutting debris away. This disclosure is effective with ferrous workpieces which produce short brittle chips, but is ineffective when machining nonferrous workpieces, such as aluminum, that produce chips that are stringers, considerably longer, and are not easily mechanically moved through the double fluted, nonfluidized portion of the drill. If the drill of U.S. Pat. No. 2,912,887 were to be used at high rotary speeds, such as in excess of 6000 rpm and high feed rates in excess of 60 inches per minute, the drill would not be able to evacuate the chips rapidly enough and the drilling operation would jam.

SUMMARY OF THE INVENTION

To overcome the problem of high speed, high feed rate chip removal in deep hole drilling of nonferrous workpieces, the invention herein provides the following construction: (a) a shank for receiving rotary power, (b) an elongate bit extending from such shank coaxially aligned therewith and having a continuous single spiral land occupying one quadrant or less of said bit cross-section with a single spiral flute surrounding said land; (c) a cutting end portion extending integrally from said bit, said end portion having a conically-shaped end surface interrupted by diametrically opposed flutes, one of said flutes being a continuation of the bit flute thereby to define cutting edges, said edges further being defined by arcuate indentations resulting in a plurality of cusps to assist in breaking chips as they are formed; and (d) high pressure fluid means for cooling the bit, end portion, and chips during drilling and for hydrodynamically forcing the broken chips along said flutes, said high pressure fluid means extending centrally axially through said shank and end portion, terminating in exit openings in said end surface.

Preferably, the cutting end portion is restricted to an axial length less than the length associated with one revolution of the singular land or flute of the bit. Advantageously, the drill of this invention is used for drilling of openings which are in length at least 16 or 17 times the diameter of the opening to be drilled.

Preferably, the feed rate for the construction of this invention is at least 200 inches per minute and advantageously 260–412 inches per minute. It is preferable to operate such drill bits at speeds of at least 5000 rpm and advantageously at rotary speeds of 10,000 rpm. The diameter of the hole that may be drilled using this drill construction at such high speeds and feed rates preferably has a diameter of ⅛ inch or less.

High pressure fluid means may employ cooling fluid under a pressure in the range of 800 psi.

The composition of the workpiece may advantageously consist of all alloys of aluminum. The composition of the drill shank, bit, and end portion may be selected from the group of high speed steel and cemented carbides. The end portion may additionally contain ceramic tippets or implants.

Advantageously, the end portion of the drill may contain a ceramic insert in the form of a rectangular body, which body extend across the diameter of the drill bit so that the cutting edges will be primarily defined by the ceramic material.

SUMMARY OF THE DRAWINGS

FIG. 1 is an elevational view of a drill construction according to U.S. Pat. No. 2,912,887, the closest prior art known to applicant;

FIG. 2 is an elevational view showing the features of this invention;

FIG. 3 is an enlarged end view of the construction of FIG. 2 taken along line 3—3 thereof;

FIGS. 4 and 5 are sectional views taken substantially along lines 4—4 and 5—5 respectively of FIG. 2.

DETAILED DESCRIPTION AND BEST MODE

As shown in FIG. 2, the drill construction 10 of this invention broadly comprises shank 11 for receiving rotary power, an elongate bit 12 extending coaxially from shank 11, a cutting end portion 13 integral with and extending from bit 12 to present a conical end surface 14, and fluid means 15 for conveying high pressure fluid to the end face or surface.

The bit 12, as shown in FIG. 5, has a continuous single spiral land 16 occupying a quadrant or less of the bit circular cross-section 17. A continuous spiral flute 20 (i) surrounds the land 16, (ii) provides a relief or groove to a radial depth 19 (preferably about 25% of the diameter of the bit), and (iii) occupies at least three quadrants of the cross-sectional area. Sides 18 of the flute 20 may be arranged to lie on a plane that passes through the axis 21 of the bit or may be at an angle of about 48° from such plane. The spiral for the land 16 and flute 20 may desirably have a rotary angle effective to extend an axial length of about 1.5 inches for each revolution of the spiral. The overall diameter 37 of the bit should be desirably ½ inch or less when machining at speeds and feed rates contemplated herein. The composition of the shank, bit, and end portion may be high speed steel or cemented carbides, such as C-3 carbide.

As shown in FIGS. 2 and 3, the cutting end portion 13 has two diametrically opposed lands 22 and 24, land 24 being an extension of land 16 of the bit. The end portion 13 extends an axial length 23 generally equal to or less than the length of the spiral for one revolution thereof. The conical end surface 14 is interrupted by the flutes 25 and 26 to define cutting edges 27 and 28. Each of the edges are further configured by arcuate indentations 29 and 30 resulting in a pair of cusps 31 and 32 to assist in the breaking up of chips cut from the workpiece being drilled. Each radially inner arcuate indentation 30 has a conically-shaped surface 33 adjacent thereto to assist in the chip breaking action. The end Portion may additionally contain tippets or implants of ceramic at the cutting edges.

The high pressure fluid means 15 has a central passage 34 extending axially through the shank, bit, and end portion terminating in exit ports 35 and 36 in the central region of each of the opposed sections of the end surface 14. The passage 34 desirably has a diameter of about 0.060 inches and conveys fluid pressure of about 800 psi.

In operation, the drill construction is driven at rotary speeds of at least 5000 rpm, preferably at least 10,000 rpm, and advanced into a nonferrous workpiece, such as an aluminum alloy of the series AA 319, at a feed rate of at least 60 inches per minute and advantageously 200–420 inches per minute. The drill construction is effective to drill holes to a depth of at least 16 times the diameter of the hole, and optimally 24 times the diameter of the hole being drilled, at such machining conditions. Cooling fluid is emitted at exit openings 35 and 36 to effectively and immediately reduce the temperature of the chips generated, making them more susceptible to embrittlement and thereby breaking up by the cutting edges and cusps of the end surface 14. Such broken chips then are more easily conveyed hydrodynamically by the high pressure fluid through the short flutes 25 and 26 into the wider single flute 20 which is extremely effective in transporting the increased volume of chip generation at such high rotary speeds and high feed rates.

The result of using this drill construction is extended tool life and improved hole quality.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

What is claimed is:

1. A high speed fluted drill for deep penetration drilling in nonferrous workpieces, comprising:
   (a) a shank for receiving rotary power;
   (b) an elongate bit extending from said shank coaxially aligned therewith and having a continuous single spiral land occupying one quadrant or less of said bit cross-section, with a single continuous spiral flute surrounding said land, said land occupying about a 90° sector with an ungrooved outer exposed face;
   (c) a cutting end portion extending integrally from said bit, said end portion having a conically-shaped end surface interrupted by diametrically opposed flutes, each of said flutes having being a continuation of the bit flute thereby to define cutting edges, said edges further being defined by arcuate indentations resulting in a plurality of cusps to assist in breaking chips as they are formed; and
   (d) high pressure fluid means terminating in exit openings in said end surface for cooling the bit, end portion, and chips during drilling and for hydrodynamically forcing the broken chips along said flutes.

2. The construction as in claim 1, in which said cutting end portion has a coaxial length less than the length associated with one quarter revolution of said singular lend or flute.

3. The construction as in claim 1, in which the composition of said bit and end portion is selected from the group of high speed steel and cemented carbides.

4. A method of drilling holes in aluminum-based workpieces, comprising:
   (a) bringing a rotary driven elongate bit and end portion into contact with said workpiece, the bit having a continuous single spiral land occupying a quadrant or less of the cross-section of said bit and a single spiral flute surrounding the land, the cutting end portion extending for and being integral with the bit, the end portion having a conically-shaped end surface interrupted by diametrically opposed flutes, both of said flutes being a continuation of the bit flute interrupted by an additional land, said edges further being defined by arcuate indentations resulting in a plurality of cusps to assist in breaking chips as they are formed;
   (b) introducing high pressure cooling fluid axially through said bit and end portion exiting from ports at diametrically spaced locations of said end surface, said fluid being delivered at a pressure of about 800 psi, while said bit and end portion are driven at rotary speeds of at least 5000 rpm and at feed rates of at least 60 inches per minute.

5. The method as in claim 4, in which the length of hole drilled is at least 16 times the diameter of the hole being drilled.

6. The method as in claim 4, in which said drill is operated at a rotary speed of at least 10,000 rpm and the feed rate for said drill is in the range of 200–420 inches per minute.

* * * * *